US007295751B2

(12) United States Patent
Elberbaum

(10) Patent No.: US 7,295,751 B2
(45) Date of Patent: *Nov. 13, 2007

(54) METHOD AND APPARATUS FOR CONTINUOUS FEED OF DISKS FOR RECORDING DIGITAL VIDEO SIGNALS AND AUTHENTICATING THE DIGITALLY RECORDED DISKS

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 1137 days.

This patent is subject to a terminal disclaimer.

(21) Appl. No.: 09/759,588

(22) Filed: Jan. 12, 2001

(65) Prior Publication Data

US 2002/0044765 A1    Apr. 18, 2002

Related U.S. Application Data

(63) Continuation-in-part of application No. 09/688,901, filed on Oct. 16, 2000.

(51) Int. Cl.
H04N 5/91 (2006.01)
H04N 5/00 (2006.01)
H04N 7/167 (2006.01)

(52) U.S. Cl. .............................. 386/1; 386/46; 386/95; 386/96; 386/125; 386/126; 380/201; 380/202

(58) Field of Classification Search .................. 386/46, 386/94, 95, 124, 125, 126, 96, 103, 104; 348/153; 380/201, 202
See application file for complete search history.

(56) References Cited

U.S. PATENT DOCUMENTS

| 6,222,800 | B1 * | 4/2001 | Miller et al. | 369/30.19 |
|---|---|---|---|---|
| 6,249,835 | B1 * | 6/2001 | Isoda | 710/100 |
| 6,295,139 | B1 * | 9/2001 | Yamauchi et al. | 358/443 |
| 6,301,430 | B1 * | 10/2001 | Oguro et al. | 386/94 |
| 6,463,026 | B1 * | 10/2002 | Anderson | 720/719 |
| 6,782,190 | B1 * | 8/2004 | Morito | 386/94 |

* cited by examiner

Primary Examiner—John Miller
Assistant Examiner—Jamie J Vent
(74) Attorney, Agent, or Firm—Katten Muchin Rosenman LLP

(57) ABSTRACT

A digital signal recording apparatus and a method of operating the same, used in conjunction with TV and video cameras, for example for security applications, includes a disk feeder system having a disk recorder and an upper compartment for holding fresh unrecorded disks, a pull slider assembly which pulls a first fresh disk at the bottom of the compartment and places the same and a printing head assembly which imprints coded information onto the placed disk, a disk recorder having a sliding table for supporting the disk and a lower compartment which accommodates the recorded disks. Supported by the sliding table the recorded disk is retracted into the disk recorder which, after the completion of recording, generates a command signal to start a new cycle. An exclusive code is imprinted onto the surface of the disk and coded signals commensurate with the exclusive code are generated by a controller and mixed with the digital video signals recorded by the disk recorder to authenticate the recording of the disk outputted from the disk feeder system. The apparatus may be equipped with a pull lever which engages cutouts provided on a fresh disk tray to transport the tray containing fresh disks from a feeding position to a recording head.

22 Claims, 15 Drawing Sheets

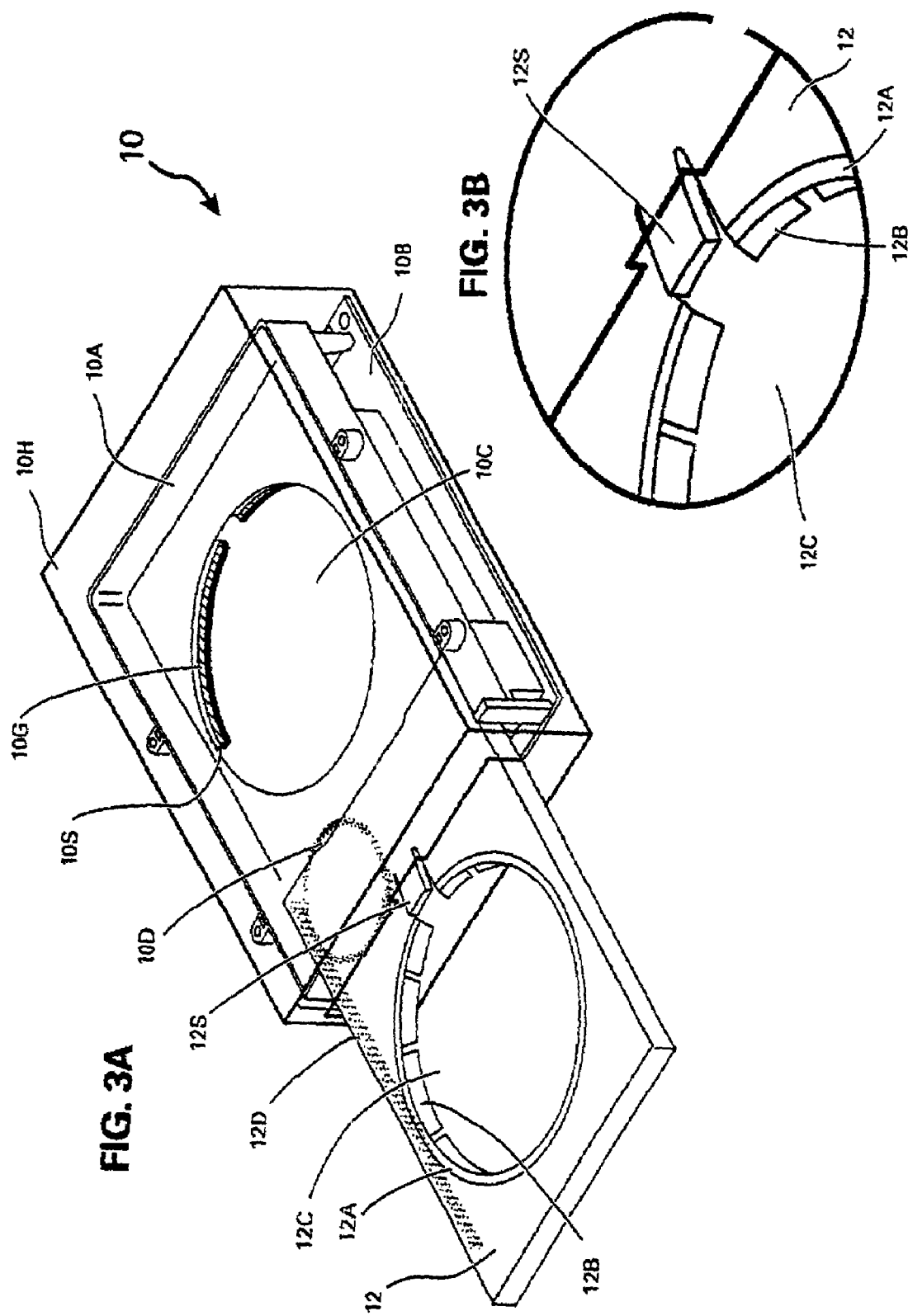

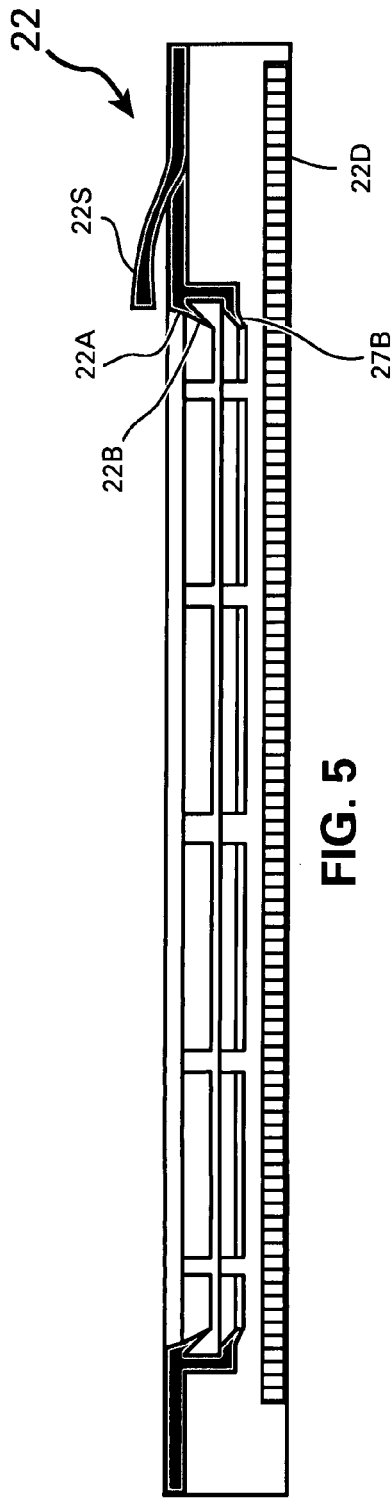
FIG. 5
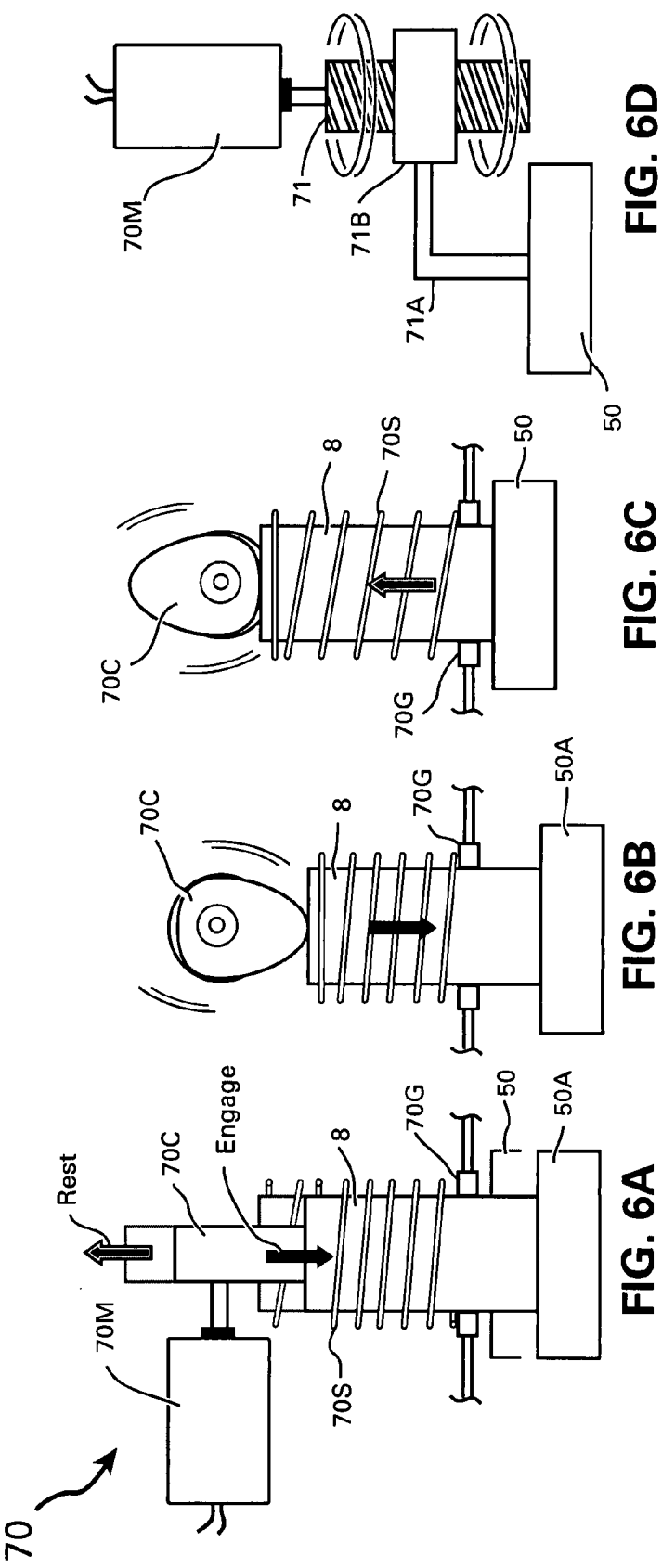
FIG. 6A
FIG. 6B
FIG. 6C
FIG. 6D

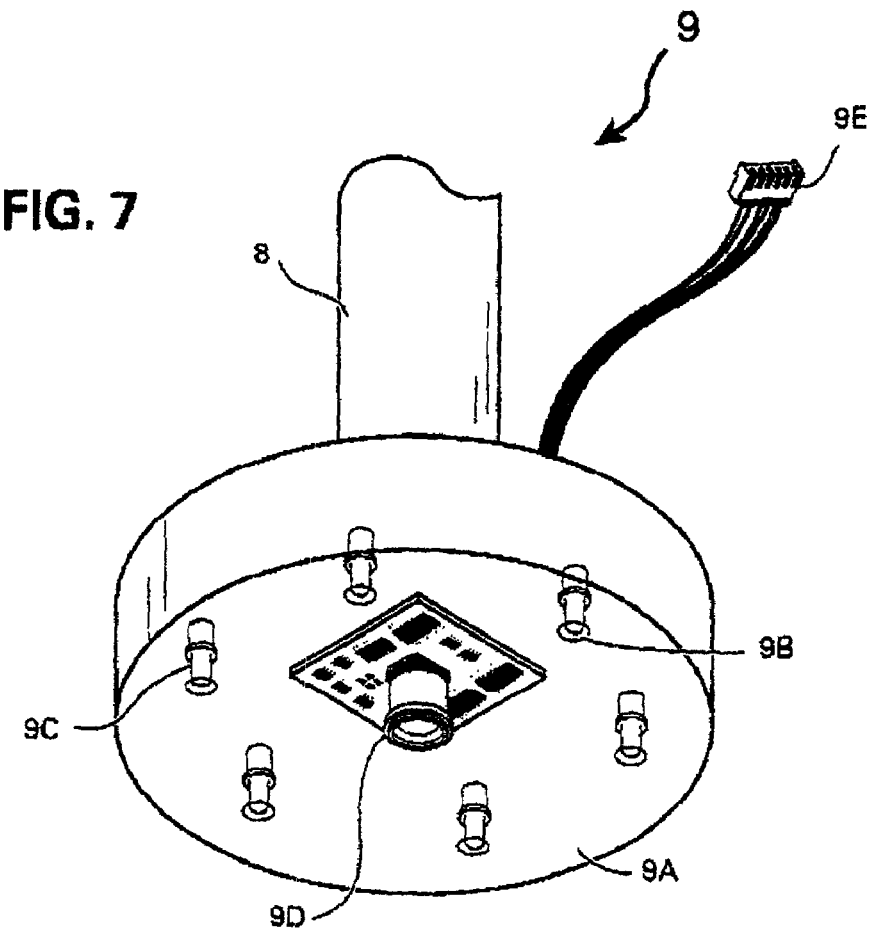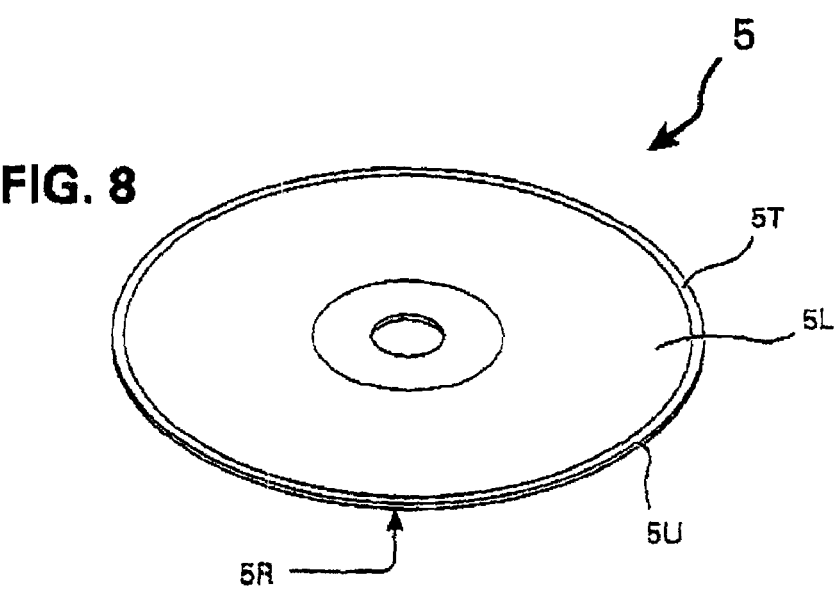

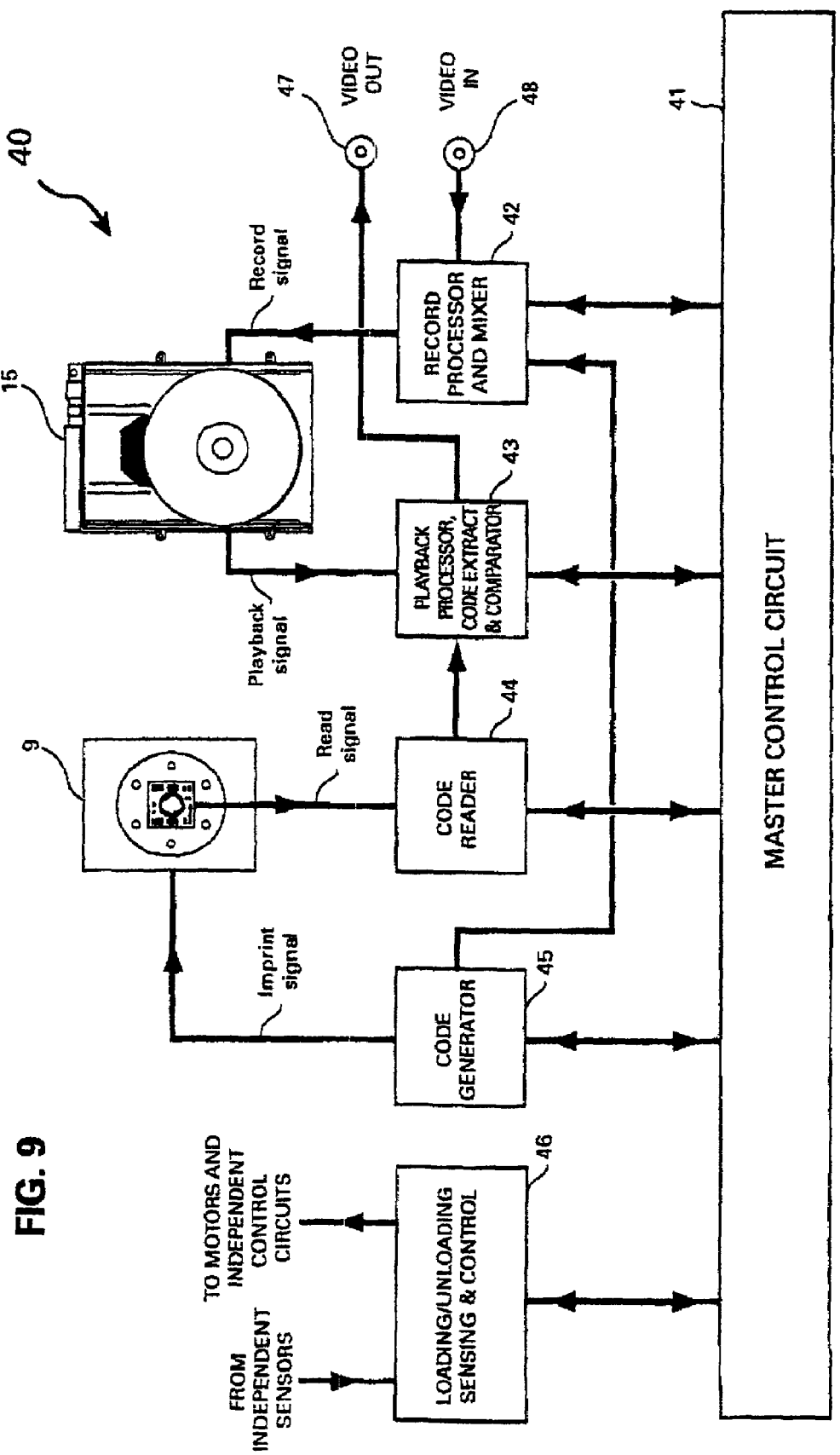

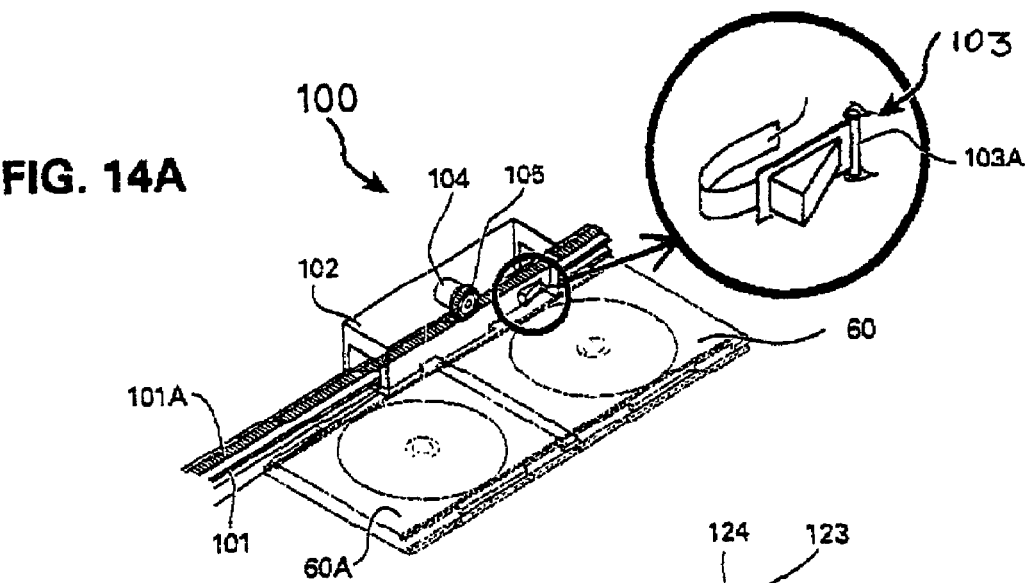
FIG. 14A
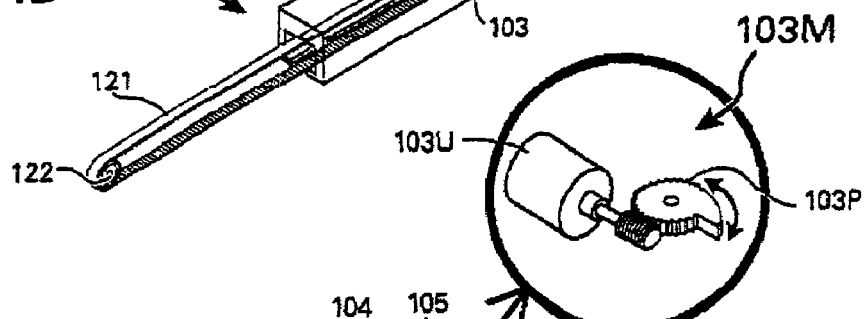
FIG. 14B
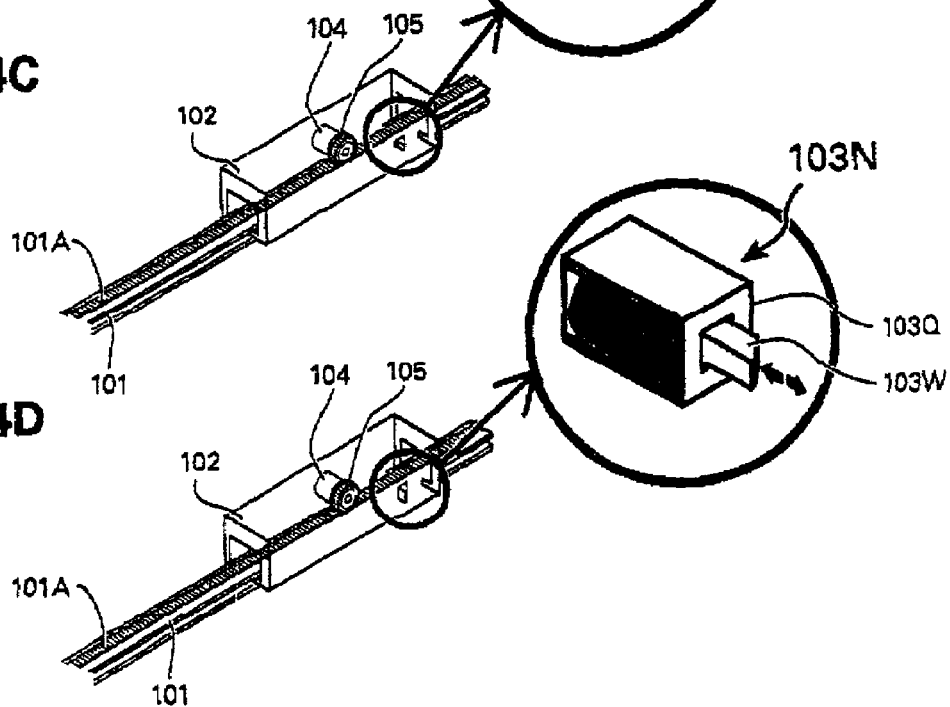
FIG. 14C
FIG. 14D

METHOD AND APPARATUS FOR CONTINUOUS FEED OF DISKS FOR RECORDING DIGITAL VIDEO SIGNALS AND AUTHENTICATING THE DIGITALLY RECORDED DISKS

CROSS-REFERENCE TO RELATED APPLICATION

This application is a continuation-in-part of application Ser. No. 09/688,901 filed Oct. 16, 2000 and now pending.

BACKGROUND OF THE INVENTION

1. Field of the Invention

This invention relates to digital recording apparatuses used in conjunction with television and video cameras for observation, monitoring and security applications.

2. Description of the Prior Art

Signals of television cameras used in an observation system are fed to the monitoring site via closed wired circuits, or via public communication lines such as analog telephone lines or digital telephone lines, or via computer network or via RF links are commonly recorded onto a video cassette, such as the well known VHS, using VHS recorder. The VHS recorder is an analog recorder for recording analog television signals. Such analog recording onto VHS cassettes have been accepted by the courts at large as evidence, primarily on the grounds that the altering of the signals content is extremely difficult and moreover, such tampering with the recorded signals by trying to alter its content can be detected by experts. Moreover, the wide use of such analog recording onto VHS cassettes made the analog recording low in cost and popular. With the recent advances in digital recording of television signals it became simple to record the signal of television cameras used in observation system onto a hard disk of a PC or onto a hard disk of a specially constructed digital recorders. However, the hard disk of the PC or of the digital recorder has a finite capacity, which limits the length of time for archiving and/or storing the accumulated recorded signals. This can be solved by adding multiple hard disks or by using retractable hard disks. However, such retractable hard disk is very costly and requires expertise in handling. Another method to archive and store the recorded digital signals is by transferring the recorded digital signals onto digital tapes, cassettes, diskettes or disks such as the well-known CD or DVD.

This however causes a serious legal problem, hindering the use of the recorded material in courts; first because the recording is no longer the original recorded media, and secondly, it is literally impossible to identify the original from a copied or transferred data, and thirdly it is simple to alter a digitally recorded picture by changing its color, changing its time and date, removing objects from the picture content or adding objects into the picture. The ability to present a modified picture and to present a copied recording as an original recording, prevents the use of the digitally recorded pictures on tape, disk or diskette as evidence in courts. Furthermore, the tapes, disks and diskettes offer a limited recording time for no more than several hours which requires constant attendance for unloading and loading the tapes, disks and the diskettes, alternatively there are variety of automatic machines known as "juke boxes" for loading, unloading the recorded media that also provide for management of the recorded data. Such juke boxes however have also a finite data storage capacity and are very costly.

SUMMARY OF THE INVENTION

An object of the present invention is to provide a method and apparatus for automatically feeding disks into a digital recorder and for automatically authenticating the recorded disks by imprinting coded information onto the disks and recording a coded data commensurating with the imprinted code into the picture signals, thereby providing the means for authentication of the disk as an original recorded media.

Another object of the invention is to provide a low cost disk changer that can record continuously a number of disks for an extended period of time by means of a simple loading of fresh unrecorded disks and simple unloading of the imprinted/recorded disks.

The above objects are achieved by an apparatus for digital recording, which comprises an imprinting head assembly, an upper compartment for holding fresh unrecorded disks, a pull slider assembly for pulling a first fresh unrecorded disk at the bottom of the upper compartment and for placing the pulled fresh unrecorded disk under said imprinting head assembly, said imprinting head assembly imprinting coded information onto the freshly placed disk, a disk recorder having a sliding table for supporting said disk, and a lower compartment for accommodating accumulated imprinted/recorded disks. The pull slider and the sliding table operate in concert such that when the pull slider and the sliding table are fully extended the freshly pulled disk and the imprinted/recorded disk are aligned against each other under the imprinting head. The imprinting head is mounted under a sliding piston to slide down and engage the freshly pulled disk for imprinting the coded information onto the disk surface and for pushing downward the freshly imprinted disk away from the pull slider and into the sliding table, which in turn ejects the imprinted/recorded disk from the sliding table into the lower compartment. Supported by the sliding table, the freshly imprinted disk is retracted into the disk recorder for recording. Simultaneously, the sliding piston starts its upward movement raising the imprinting head while the pull slider retracts into the pull slider assembly readying itself for the next disk pull cycle. As the disk recorder completes its recording it will generate a command signal to start a new cycle of pulling, imprinting and loading a fresh disk into the sliding table to finally eject the newly recorded disk in an endless rotation for as long as fresh disks are loaded into the upper compartment and the imprinted/recorded disks are removed from the lower compartment.

The objects of the invention are also attained by a method for authenticating the recording of digital video signals onto a fresh unrecorded disk by a disk recorder of a disk feeder system including coding generating and mixing means, and a code imprinter, the method comprising the steps of: feeding said fresh disk from a fresh disk compartment of said disk feeder system to said disk recorder through said code imprinter; generating an exclusive code for each said fresh disk fed to said disk recorder and imprinting said exclusive code onto a surface of said fresh disk such that an imprinted disk is fed to said disk recorder; and generating coded signals commensurating with said exclusive code and mixing said coded signals with said digital video signals recorded by said disk recorder, thereby authenticating said recording of the recorded disk outputted from said disk feeder system.

The objects of the present invention are further attained by a method for authenticating the recording of digital video signals onto a coded disk by a disk recorder of a disk feeder system including a code reader and a code generating and mixing means wherein said coded disk includes an exclusive code imprinted onto its surface, the method comprising the steps of: feeding said coded disk from a fresh disk compartment of said disk feeder system to said disk recorder through said code reader; reading said exclusive code of said coded disk fed to said disk recorder; and generating coded signals commensurating with said exclusive code and mixing said coded signals with said digital video signals recorded by said disk recorder, thereby authenticating said recording of the recorded disk outputted from said disk feeder system.

The method of the present invention may be adapted for authenticating the reading back of the digital video signals recorded, from the recorded disk, wherein the disk recorder further includes readback means and said disk feeder system further includes a code reader and a code signal extractor and a comparator, and method further comprising the steps of: loaded said recorded disk into said fresh disk compartment for feeding said recorded disk to said disk recorder through said code reader for reading said exclusive code from the surface of said recorded disk and reading back said video digital signals through said readback means; and extracting said coded signals through said code extractor and comparing said reading of said exclusive code with said extracted coded signals and outputting authentication signals when said exclusive code and said coded signals commensurate.

BRIEF DESCRIPTION OF THE DRAWINGS

The foregoing and other objects and features of the invention will become apparent from the following description, given as a non restrictive example and made with reference to the accompanied drawings, in which:

FIG. 3A is a perspective view of a pull slider assembly for pulling a fresh disk from a fresh disk stack of the apparatus of the present invention;

FIG. 3B is a top view of a pull slider of the pulling slider assembly of FIG. 3A;

FIG. 5 is a sectional view of a combined pull slider and the sliding table of FIG. 2 and FIG. 3;

FIGS. 6A-6D are side and front views, respectively, of an imprinting head assembly in its engage-rest states;

FIG. 7 is a perspective view of the imprinting head incorporating an imprint readout device;

FIG. 8 shows a recording disk with an imprint coat; and

FIG. 9 is a block diagram of the system control of the apparatus of the present invention.

FIGS. 14A-14D are perspective views, also showing enlarged view of some parts of a pull slider assembly for pulling a fresh tray from a fresh tray stack of the apparatus of the present invention;

DETAILED DESCRIPTION OF THE PREFERRED EMBODIMENT

Figure 1:
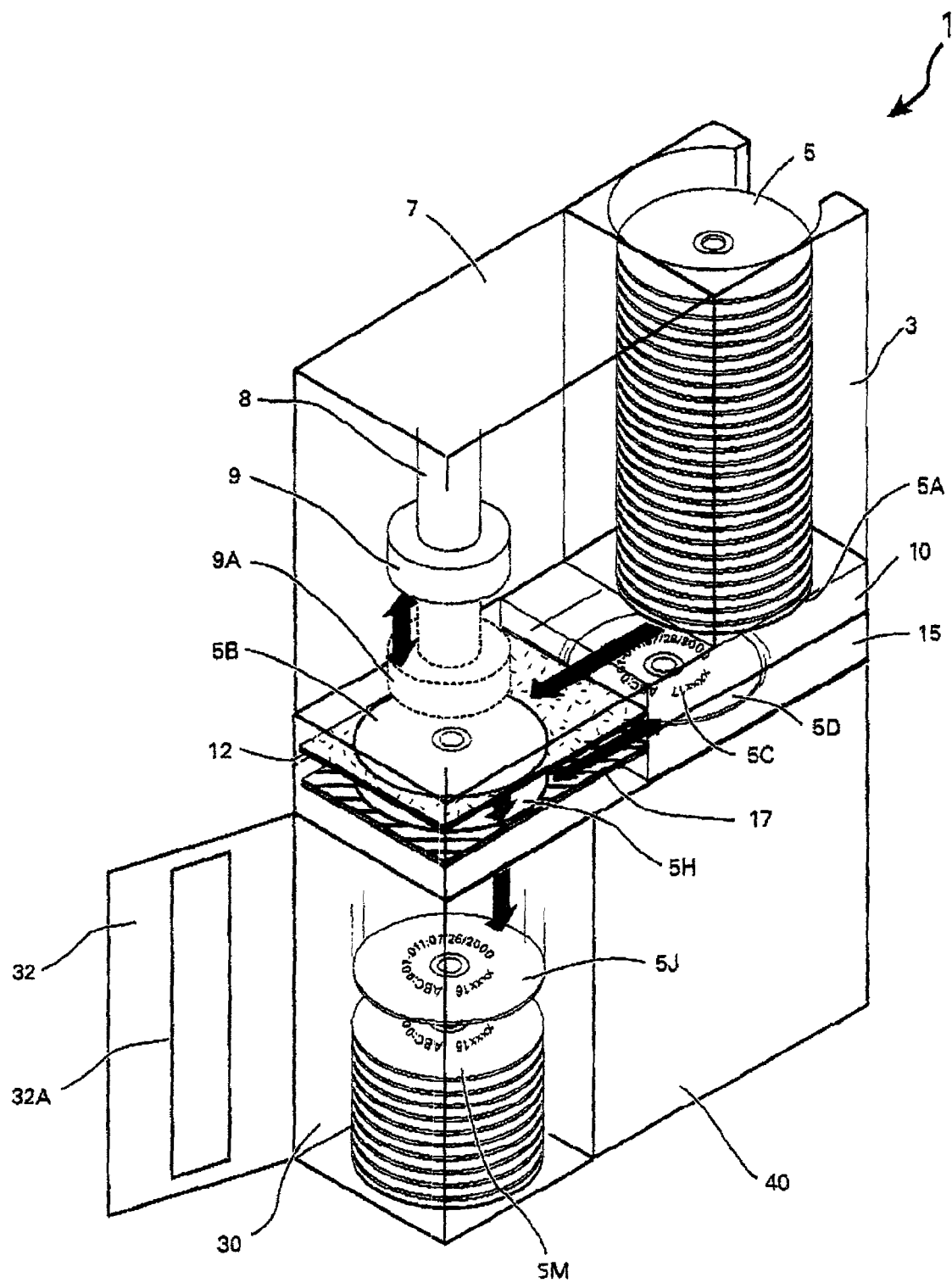
FIG. 1 is a perspective view of an exemplary embodiment of a digital recording apparatus according to the invention.

FIG. 1 shows an exemplary embodiment of a digital recording apparatus 1 which includes a compartment 3 for holding a fresh stack of disks 5 on top of a pull slider assembly 10. The pull slider assembly includes a pull slider 12 that is shown extended all the way out from the pull slider assembly 10, containing and supporting a pulled fresh disk 5B into a position directly under an imprinting head 9. A disk recorder 15 which is mounted under the pull slider assembly 10, includes a sliding table 17 shown in its extended state and supporting an imprinted/recorded disk 5H in a position directly under the fresh disk 5B. An imprinting assembly 7 which has the imprinting head 9 is attached to a sliding piston 8 which slides down to engage the imprinting head 9 with the upper surface of the fresh disk 5B for imprinting a coded information 5C onto the disk 5B and for pushing the disk 5B downward out from the pull slider 12 all the way toward the imprinted/recorded disk 5H in order to insert the newly imprinted disk 5B into the sliding table 17 and eject the imprinted/recorded disk 5H from the sliding table 17 into a lower compartment 30. The ejected disk 5H shown in FIG. 1 falls as a free falling disk 5J onto an accumulated imprinted/recorded disk stack 5M. A compartment cover 32 is shown opened but it is normally closed during the operation. The compartment cover 32 has a window 32A for instant viewing of the lower compartment content.

Figure 2:
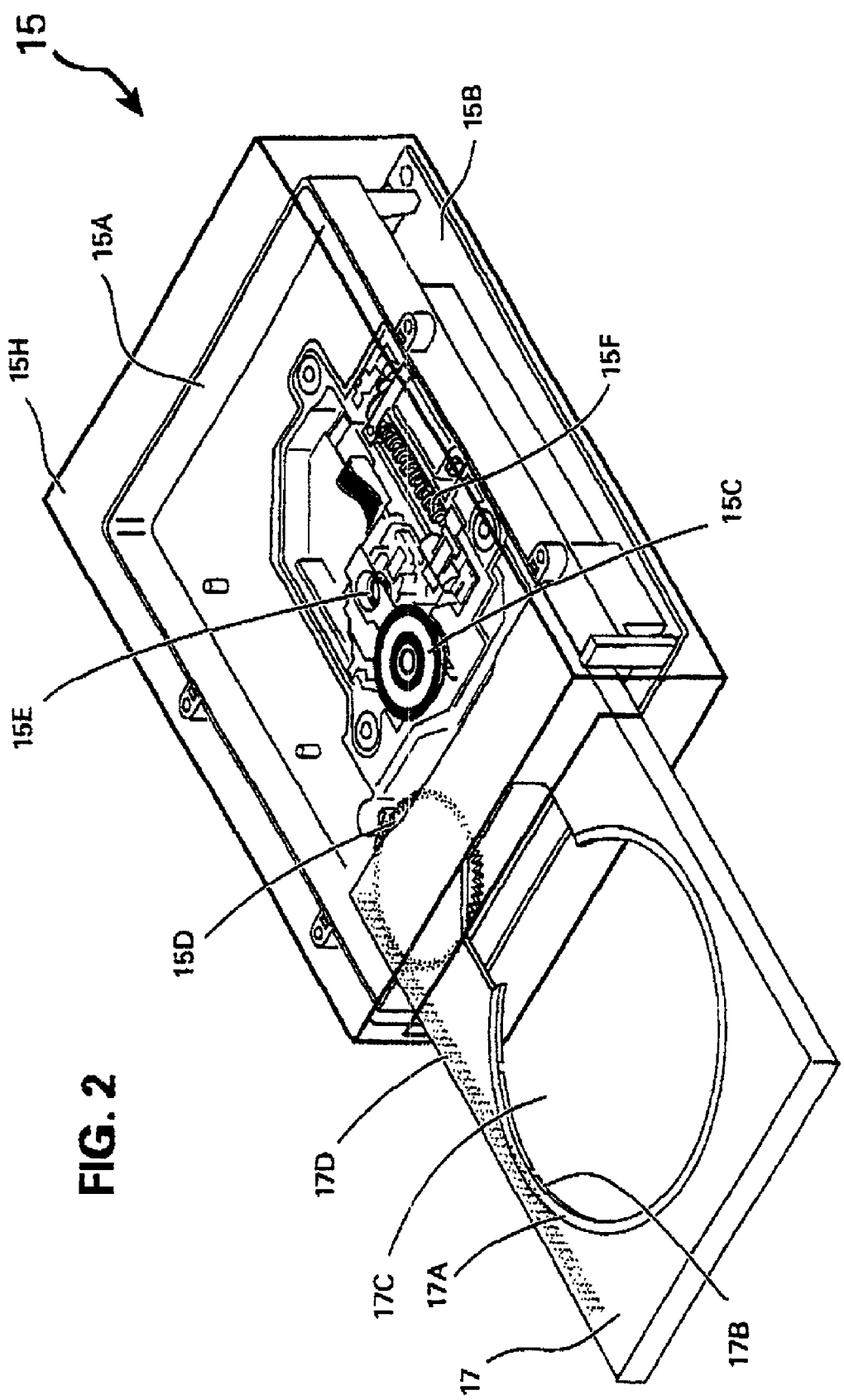
FIG. 2 is a perspective view of a well-known disk recorder with a modified sliding table to enable the ejection of a disk downward.

As the ejected disk 5J falls into the lower compartment 30 the sliding piston 8 shown in lowered position along with the imprinting head 9 starts its upwards movement cycle away from the pull slider 12 so as to bring the imprinting head 9 into its rest position. Immediately after the imprinting head 9 is pulled up the pull slider 12 that is now emptied from the disk 5B starts its retracting cycle back into the pull slider assembly 10. Simultaneously the sliding table 17 that is now loaded with a fresh disk 5B with an imprint SC starts its retracting cycle back into the disk recorder 15. The disk recorder 15 shown in FIG. 2 with its sliding table 10 is modified to provide for ejecting the disk downwards, is a well-known disk recorder used in personal computers, such as CD or DVD recorders. The disk recorder 15 will start its recording of picture signals fed to it through the electronic circuits contained in the system control 40 shown in detail in FIG. 9 and described in detail below. The system control 40 also generates the imprinted coded information SC, and mixes commensurating coded signals into the recording of the pictures signals which ties together the physical imprint of the disk to the contained recorded signals, for authenticating the imprinted disk as an original media. Referring to FIG. 2 the disk recorder 15 comprises a case 15H, a body 15A, a recording control circuit 15B, a recording and playback head 1SE, a disk drive 15C, a head drive 15F and the sliding table 17. The sliding table 17 includes a geared bar 17D driven by a driving gear 15D reciprocally, and a motor controlling the gear 15D. Such a motor is a well known motor with a gear assembly and is therefore not shown. The sliding table further includes an opening 17C for providing the supported disk 5H of FIG. 1 to be ejected downwards, a tapered circumferential rim 17A for supporting the disk 5B or 5H of FIG. 1 while moving the disk in and out from the disk recorder, and circumferentially extending tongs 12B for gripping the disk 5H prior to the final ejection. The disk drive 15C of the well known disk recorder 15 raises the disk upwards away from the sliding table 17 during the recording or playback process, by the well known disk drive 15C and lifting mechanism (not shown), and the recording/playback head 15E travels throughout the width of the disk by the well known head drive mechanism 15 (not shown). Accordingly, the supported freshly imprinted disk 5B of FIG. 1 is driven into the disk recorder 15 by the sliding table 17; it is then lifted by the disk drive 15C for recording, and when the recording is complete the disk drive 15C lowers the freshly recorded disk 5D onto the sliding table which is then extended outwards by the drive gear 15D and placed into the position under the fresh pulled disk 5B. The pull slider assembly 10 is constructed essentially with a pull-sliding table 12 similar to the sliding table 17 of the disk recorder 15.

Shown in FIGS. 3A and 3B, is the pull slider assembly 10 including a case 10H, a body 10A, a control circuit 10B, an opening for fresh disks 10C, a support 10S for the first disk in the stack, a cushion 10G and a pull slider 12. The pull slider 12 includes a geared bar 12D driven by the driving gear 10D reciprocally, an opening 12C for allowing a fresh disk to be pushed through downwards, a tapered circumferentially extending rim 12A for centering the pulled disk and tongs 12B extending downwards from rim 12A for gripping the pushed disk during the imprinting process. The pull slider 12 further has a flexible pull lever 12S shown in FIG. 3A for pulling the first or the bottom disk 5A from the fresh disk 5 stack shown in FIG. 1.

Figure 4A:
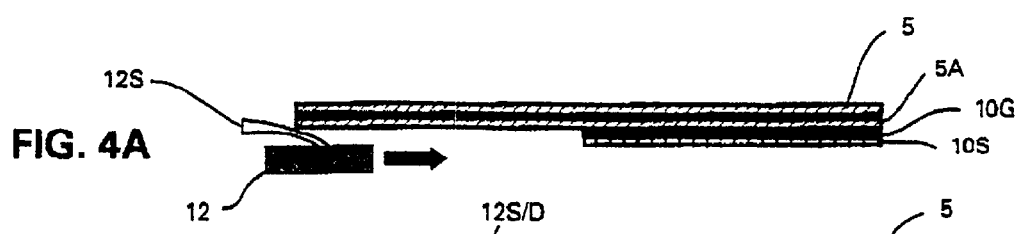
FIGS. 4A-4E are cross-sectional views showing the process of pulling and loading a fresh disk into the pull slider of FIGS. 3A and 3B.
Figure 4B:
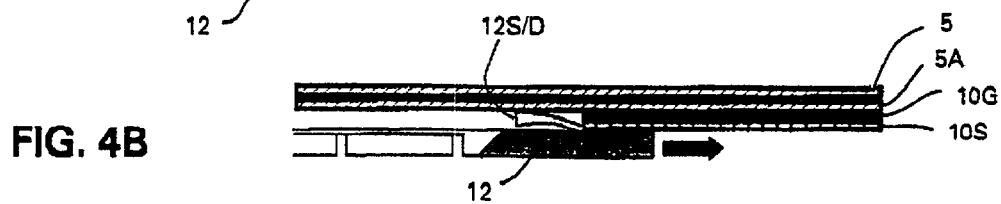
Figure 4C:
Figure 4D:
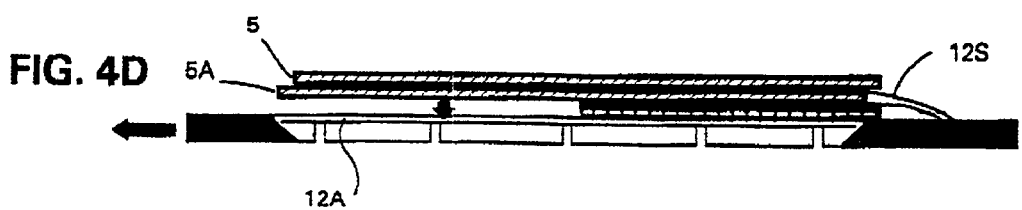
Figure 4E:
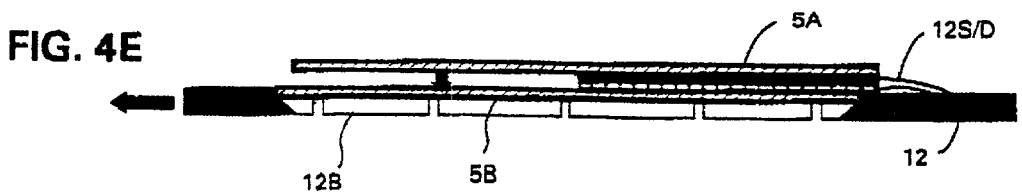

FIGS. 4A-FIG. 4E show the process of pulling and feeding the disk 5A into the sliding table, wherein FIG. 4A shows the pull slider 12 at its initial retraction and the flexible pull lever 12s which is about to be compressed under the disk 5A. FIG. 4B shows the pull slider 12 at its mid-way retraction with the pull lever 12S/D slides under the disk 5A. FIG. 4C shows the pull slider 12 fully retracted and the pull lever 12S stretching fully behind the disk 5A, ready to engage the disk rim. FIG. 4D shows the pull slider 12 in its early movement outwards pulling the disk 5A to a point just before the disk 5A leaves its support 10S and cushion 10G. FIG. 4F shows the disk 5B being pulled by the movement of the pull slider 12 outwards and falling into the tapered rim 12A while the newly first fresh disk 5A falls onto the cushion 10G.

When the recording of the disk is complete the control system 40 generates a start cycle command to the pull slider 12 to pull and feed a fresh disk 5B to its imprinting position under the imprinting head and to the sliding table to remove the imprinted/recorded disk 5D from the disk recorder and position the disk under the disk 5B. Thereafter, as the disks are positioned under the imprinting head 9 the piston 8 starts its downward movement to engage the printing head 9 with the upper surface of the fresh disk 5B and thereby also push the imprinted disk 5B downwards into the sliding table 17 all the way so that the imprinted/recorded disk 5H is ejected into the lower compartment 30.

FIG. 5 shows the pull slider and the sliding table being combined into a single sliding table 22 in which the pulling of a disk from the fresh disk compartment and the feeding of the disk to the disk recorder is performed by a single sliding table, wherein the tapered rim 12A, tongs 12B and the pull lever 12S of the pull slider 12 are replaced by a tapered rim 22A, tongs 22B and a pull lever 22S of the combined slider 22. The tapered tongs 17B and the geared bar 17D of the sliding table 17 are replaced by tapered circumferentially extending tongs 27B and a geared bar 27D of the combined slider 22, which otherwise operates in the same manner as the two individual sliders 12 and 17.

The shown pull lever 12S of FIGS. 3A and 3B or the pull lever 22S of FIG. 5 are simplified illustrations of a pull lever. In practice such lever may be supplied with means for preventing damage to the disk surface, by using rollers, balls or other rotating parts to prevent direct touch by the pull lever onto the surface of the disk. Similarly, the tapered rim 12A or the tong 12B of FIG. 3A and the tongs 17B of FIG. 2 or the tapered rim 22A and the tongs 22B and 27B of FIG. 5 are simplified illustrations of the support means for the processed disks. Many other shapes and forms can be used for placement, support and ejection of the processed disks. Similarly, the geared bars 12D and/or 27D of FIG. 3A and FIG. 5, respectively, along with the drive gears 10D and 15D can be differently constructed to drive the sliding table 17, the pull slider 12 or the combined slider 22.

Shown in FIG. 6A, FIG. 6B and FIG. 6C is an imprinting head assembly 70 which consists of the imprinting head 9, piston 8, a motor assembly 70M, a cam 70C, a spring 70S and a guide 70G. FIG. 6A shows a side view of the assembly 70 with the piston 8 and the imprinting head 9 in their engaged state denoted at 50A and their rest state denoted at 50, FIG. 6B shows a front view of the assembly 70 in its engaged state identical to that of FIG. 6A, with its spring 70S fully compressed, while FIG. 6C shows the same front view of the assembly but with its piston 8 in a raised position and the imprinting head 9 being in its rest position. The spring 70S of FIG. 6C shown in its decompressed or expanded state. The guide 70G shown attached to part of the body of the imprint assembly 7 (not shown in these figures) is a well-known bushing for guiding the piston up-down movement. FIG. 6D shows another well known reciprocal arm 71A supporting the imprinting head 9 attached to a threaded bushing 71B driven up-down by a threaded shaft 71 and powered by the motor 70M. The illustrated movement of the imprinting head assembly is achieved by use of a well known up-down piston or a threaded shaft driven mechanism. However, there are many other well known mechanical devices to drive an imprinting head up-down and for applying pressure onto the imprinted disk while imprinting a coded information 5C shown in FIG. 1 so as to place/eject the disks into and from their respective sliders. The imprinting head itself can be a well known laser imprinter, a well known heat stamping head, a well known LED illuminator/imprinter, a well known ink jet imprinter, a well known optical/chemical imprinting head, a well known ribboned imprinter, or a well known adjustable rubber pad. Many other well known imprinting methods and heads can be utilized and moreover, as will be explained later, the fresh disks 5 of FIG. 1 can be fed already imprinted to the fresh disk compartment 3 and/or the imprinter head can be replaced by a well known sticker applicator, sticking imprinted bar codes or other imprinted coded, non removable stickers onto the fresh disk surface.

Shown in FIG. 7 is the imprinting head assembly 9 including a transparent surface 9A for providing a light passage for lasers 9B or LEDs 9C along with a reader/sensor 9D for reading the imprinted code. The reader/sensor 9D shown uses a wide angle lens with an CCD device. However, any other well known type of imprint reader/sensor such as CMOS, pin diodes or photo transistors can be used instead. The lasers 9B and LEDs 9C can be used for the imprinting process, while the LEDs 9B can be used for illuminating the imprint to enable the reader/sensor 9D to read the imprint such as the imprinted code 5C shown in FIG. 1.

The conventional disk recorder 15 shown in FIG. 2 further includes playback circuits for reading the signals from the recorded disk and for outputting the playback signals to a processing circuits of the system control 40.

Shown in FIG. 9 is a block diagram of the system control 40 which includes a master control circuit 41 for setting, controlling and operating the system, a recording processor circuit 42 for processing video input signals fed through a video input 48 and code signals fed from a code generator 45 and for feeding the processed signals to the disk recorder 15 in accordance to control command of the master control circuit 41. The code generator 45 also generates an exclusive, individual coded information to the imprinting head 9 for each disk being fed to the imprinting head 9, wherein the coded signals fed to the recorded processor 45 commensurate with each such exclusive, individual coded information fed to the imprinting head 9. A playback processor 43 of the system control 40 receives the read out signals from the disk recorder 15 and the read out code from the imprinting head 9 via the code reader circuit 44 and compares the code contained in the playback signals with the code read by the imprinting head, and feeds the comparison data to the master control circuit 41 and/or generates a yes or no signal to the master control circuit and/or into a display signals through a video out terminal 47. A loading, unloading, sensing and control circuit 46 is fed with sensing signals from well known sensors such as LED interrupters, or micro switches (not shown) for sensing the state of the pull slider 12, sliding table 17, imprinting head 9 and/or gauging such item as the level of fresh disks 5 or the level of accumulated recorded disks 5M shown in FIG. 1. The loading, unloading, sensing and control circuit 46 feeds the received data to the master control circuit 41 and receives control commands from the master control circuit. It is clear that by the read-write arrangement of the system control 40 it is possible to load pre-imprinted fresh disks and to generate a code signal commensurating with the pre-imprinted code that is read by the reader/sensor 9D of the imprinting head 9 and feed the generated code signal to the record processor circuit 42 for recording the video signals mixed with the generated code. The code signal generated by the code generator 45 may be an encrypted code, and use such data as time and date, station number, camera number, recorder number etc. It can be so designed that the imprinted coded information cannot reveal to the laymen any details of the actual recorded code, and that it will be impossible for a laymen to decipher the recorded code. By this it will only be possible to playback a recorded disk using the digital recording apparatus shown in FIG. 1 and only when the readout code and the extracted code from the playback signal commensurate. Only under such condition it will be possible to verify that the recorded disk is an original recorded media.

The disk 5 shown in FIG. 8 consists of a disk body 5U, a recording layer 5R, a top layer 5T and an imprinted surface or a labeled surface 5L. A pre-imprinted label can be attached to the disk surface to form labeled surface 5L but only if such a pre-imprinted label is a well known label that cannot be removed from the disk without being torn, thereby, preventing the re-use of such label with another disk. The layer or the label 5L shown covers most of a disk surface 5T. However, a smaller label 5L can be used instead, or it is possible to attach such labels by a well known (not shown) label applicator incorporated with the imprint head assembly.

The imprinted surface or the imprinted layer and/or the label 5L can be made of a soft materials or combined with soft materials or such layers can be provided with a soft rim for providing scratch protection to the disks when they are stacked up one on top of the other. Furthermore, the layer 5T can be a layer specifically matching the imprinting process such as optical/chemical process.

For the purpose of submission of evidence in courts it is preferable to use a well-known disk 5 that cannot be erased, nor re-recorded. Such imprinted disk that can only be recorded once and is recorded with a mix of code signals as explained above, provides a proof that such a digitally recorded disk is an original recorded media. Moreover, even the use of re-writable disk that can be erased and/or re-recorded and which is recorded by using the recording processes described above greatly inhibits the ability of a laymen to manipulate any individual picture and/or part of a picture, particularly when the code signals mixed with the picture signals are dynamic, encrypted and vary for every individual picture being recorded. Moreover, the controller can be programmed to read first the coded signals and the exclusive code and generate record stop command to prevent re-recording of a recorded/imprinted disk or to prevent the recording of a twice imprinted disk.

The present invention also provides for a continuous feed of disks to a digital recorder apparatus for instances that do not require the disk to be used as evidence. Alternatively the present invention can be used for an automatic search of a disk for a playback purposes only and the like.

The disks changing mechanism of the digital recording apparatus 1 of FIG. 1 uses gravitation and the free fall of disks for the loading/unloading process. However, such disk changing method prevents the introduction of multiple disk recorders 15, nor does it provide for individual trays or containers to support or protect the disks 5.

Figure 10:
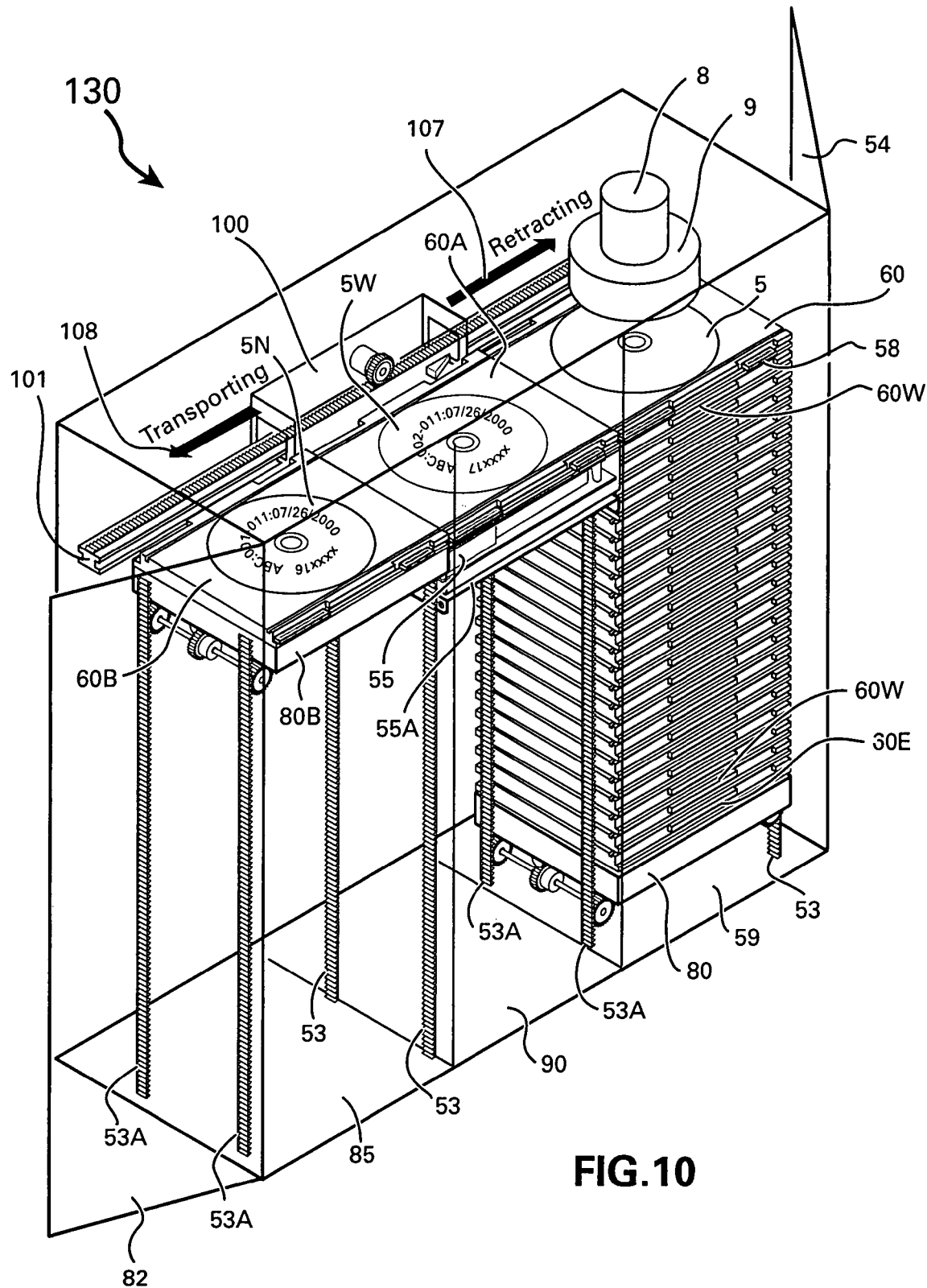
FIG. 10 is a perspective view of another exemplary embodiment of a digital recording apparatus according to the invention.

A digital recording apparatus 130 of FIG. 10, which shows a further embodiment of the present invention, offers a different disk changer mechanism wherein fresh disks 5 are supported by a tray 60. The stack of the fresh disks consisting of multiple trays 60W each containing a disk 5 shown in FIG. 10 is placed between the bottom tray 60E and the top tray 60 inside a fresh disk compartment 59 shown with its front cover 54 in the open position. The trays in the fresh disk compartment 59 are supported by an elevating platform 80 which raises the entire stack in steps equal to a single tray thickness, readying the tray 60 for a pull cycle by a pulling assembly 100. The pulling assembly 100 transports the tray 60 to a position 60A which is the loading position of a disk onto a disk recorder assembly 55. The disk recorder assembly 55 is identical to the well known disk recorder 15 of FIG. 2 except that it is operated without the outer cover 15H and without the sliding table 17 which is no longer needed because the disk 5W is loaded by the tray 60A directly to the disk driver 15C shown in FIG. 2. The disk recorder 55 is supported by a holder 55A having a length equal to the length of the tray 60.

As the pulling assembly 100 completes its forward cycle to load the tray 60 into the disk recorder 15 or to its new position 60A the elevating platform 80 is activated to elevate the stack of the fresh disk trays 60W by a single step so as to bring the upper disk 60W into position 60. Once the tray carrying the fresh disk 5 is in position 60 the imprinter or the code reader 9 will operate in a manner described for the digital apparatus 1 of FIG. 1, with the exception that it no longer applies pressure onto the disk 5 to eject it. Furthermore, when the code reader 9 reads the code from the disk surface it does not need to slide down or to contact he disk, because it can read the code from a distance. When the imprint or the readout is complete the tray 60 with the disk 5 becomes ready for transporting and when the disk recorder 55 completes the recording of the disk 5W the disk driver 15C of FIG. 2 releases the disk 5W, thereby readying the changer mechanism for a new loading/unloading cycle to begin.

Figure 12:
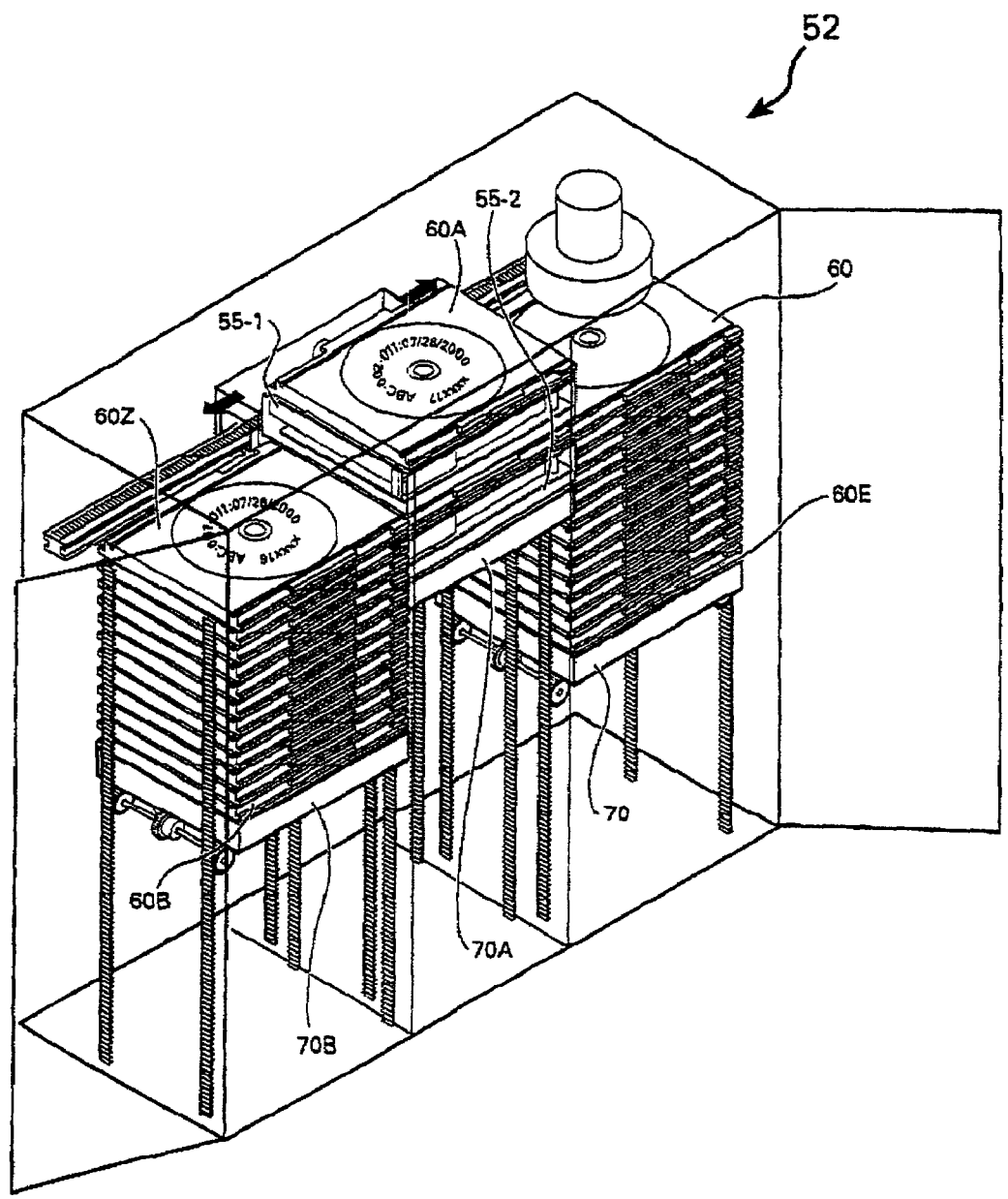
FIG. 12 is a perspective view of a digital recording apparatus of FIG. 11 with the disk recorders, a fresh tray stack and a recorded tray stack in an elevated position.

The pulling assembly 100 moves in a reciprocal movement on the guide rail and gear rack assembly 101 in a retraction direction 107 all the way to engage the tray 60 and in a transporting direction 108 to pull the tray 60 toward the disk recorder 55 and into position 60A. As the tray 60 starts its movement into position 60A its front side 64 shown in FIG. 13 pushes the tray 60A with the recorded disk 5W toward the position 60B and when the tray 60 reaches into position 60A the prior tray 60A is pushed all the way out from the disk recorder 55 onto the elevating platform 80B. The elevating platform 80B is identical to the elevating platform 80 for lowering the recorded trays stack as shown in FIG. 12 by a step equal to one tray thickness. By this step the changer mechanism 130 is readying itself to start the next unloading cycle.

The pulling assembly 100 shown in FIG. 14A includes a body 102 accommodating a motor 104 with a gear 105 for engaging a gear rack 101A such that the reciprocal rotation of the motor 104 drives the pulling assembly 100 in the retracting direction 107 and the transporting direction 108. The pulling assembly 100 further includes a pulling lever 103 for engaging a tray cutout 65L shown in FIG. 13 and for pulling the tray 60 during the transporting cycle.

Figure 16A:
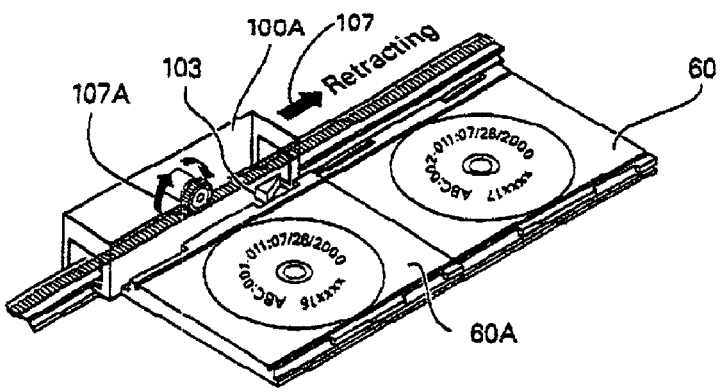
FIGS. 16A-16D are perspective views showing the process of retracting a pull lever and transporting the trays to and from the disk recorder.
Figure 16B:
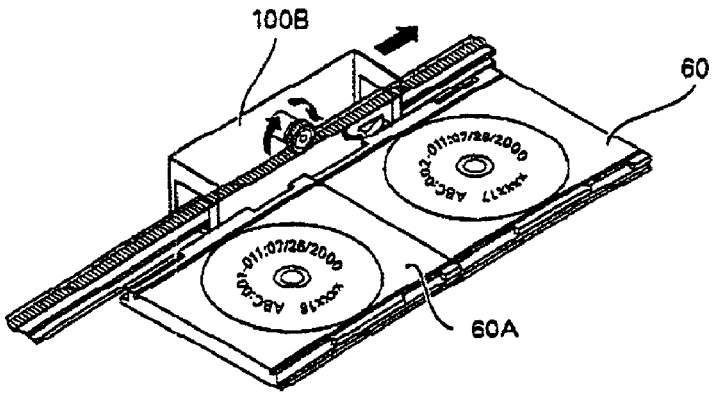
Figure 16C:
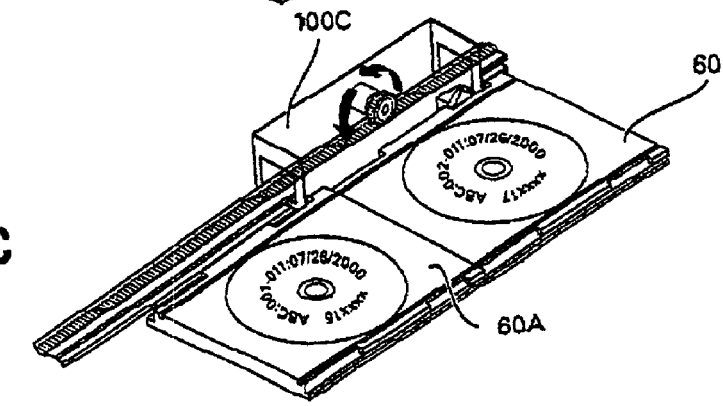
Figure 16D:
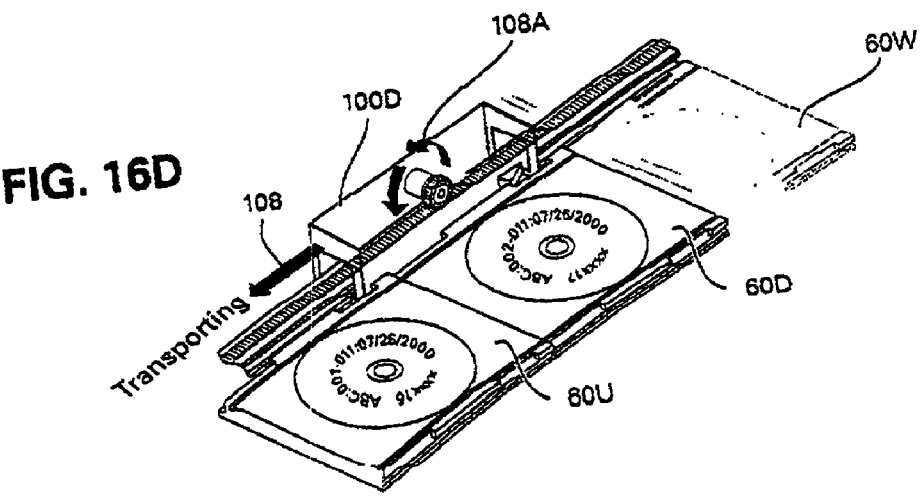

Shown in FIGS. 16A-16D is the movement of the pulling assembly 100 during retraction and transporting actions. FIG. 16A shows clockwise rotation 107A of the gear as it begins the retracting movement from the position 100A which is its maximum forward state or loading position. As shown in FIGS. 16B and 14A the pulling assembly is in its middle-way retraction with its pull lever 103 depressed inwards by the tray side so as not to obstruct the retracting movement and, as shown in FIG. 14A, the pull lever 103 has a pivoted lever 103A impelled outwards by a spring 103B. FIG. 16C shows the pulling assembly 100C starting its transporting cycle from its maximum retracting position at which time the pull lever 103 is impelled into the tray cutout 65L to engage the tray 60 and pull it toward the loading position 60A. FIG. 16D shows the process of the transporting cycle in which the tray 60 is in its middle-way position 60D pushing the tray 60A to a middle-way position 60U.

Instead of using the motor 104, the gear 105 and the guide rail with a gear rack 101 (FIG. 14A) for transporting and retracting the pulling assembly 100 it is possible to use many other types of transporting mechanisms such as a chain, belt, threaded shaft or timing belt. Shown in FIG. 14B is such mechanism 120 using a timing belt 121, driven by a motor 124 and sprockets or timing gears 122 and 123 (FIG. 14B). A body 125 of the pulling assembly 120 is similar to the body 102 of pulling assembly 100 except that it is driven by the timing belt 121 shown in FIG. 14B instead of the motor 104 and gear 105 of FIG. 14A.

Figure 17A:
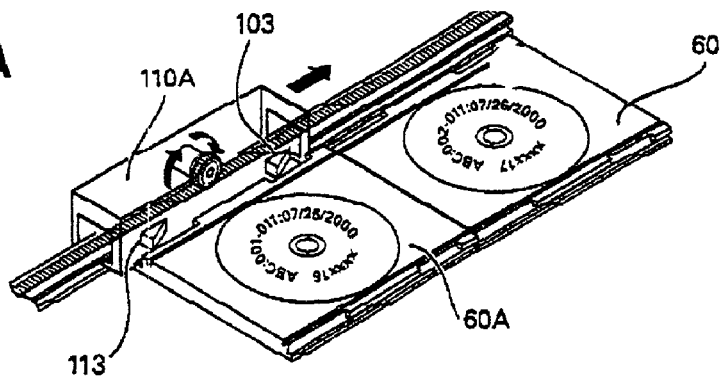
FIGS. 17A-17D are perspective views showing the retracting and transporting process of the trays with two pull levers.
Figure 17B:
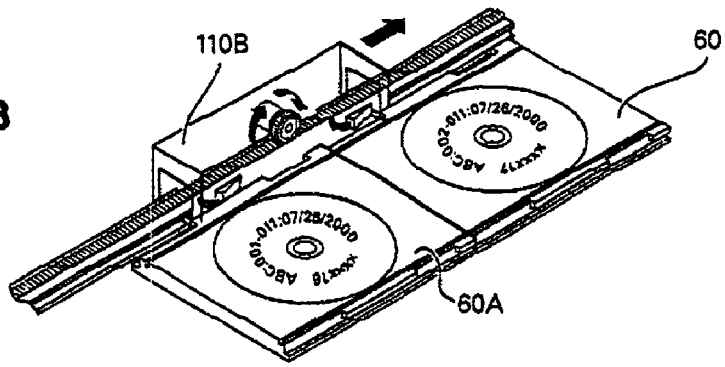
Figure 17C:
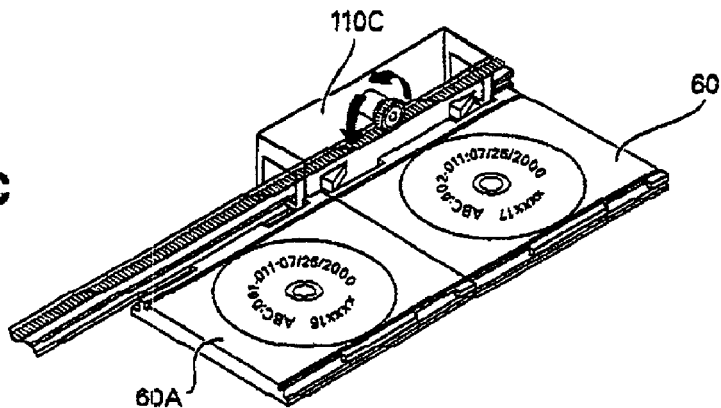
Figure 17D:
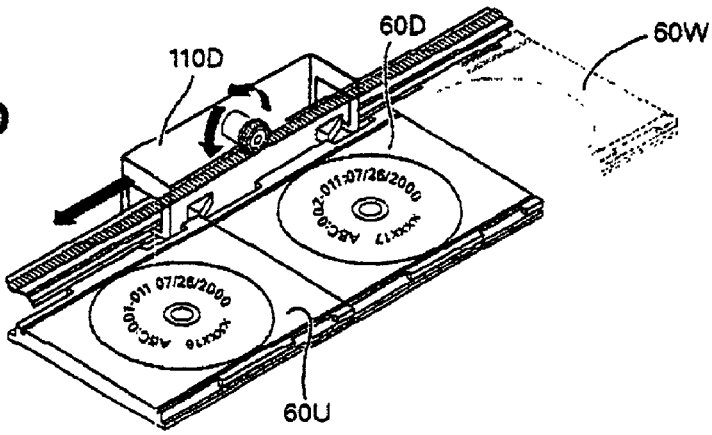

Instead of using a single pull lever 103 it is possible to use multiple pull levers such as the 103 and 113 as shown in FIG. 17A, which depicts the movement of a pulling assembly 110A at the initial retracting cycle. FIG. 17B shows a pulling assembly 110B at its middle-way retracting cycle with its pull lever 113 being depressed by the side of the tray 60A. FIG. 17C shows a pulling assembly 110C at the start of the transporting cycle and FIG. 17D shows a pulling assembly 110D at its middleway transporting cycle. The pull lever 103 shown in FIGS. 17C and 17D is shown engaging the fresh tray 60, while the pull slider 113 is engaging the recorded disk tray 60A and transporting the tray 60 to a mid position 60D and the tray 60A to mid position 60U.

The pull levers 103 shown can be made in different shapes, or they can be made to engage a cutout or cutouts such as the cutout 65L of the tray 60 shown in FIG. 113 from the upper surface of the tray or it can be made to engage the cutouts 65L of both sides of the tray simultaneously. The pull lever 103 shown in FIG. 14A consist of a hinged pull lever 103A driven or propelled by a spring 103B however instead of the pull lever 103A it is possible to use a pull lever similar to the pull lever 12S of FIG. 4B without the use of the spring 103B. Moreover, the pull lever 103A can be differently shaped or constructed as long as it does not hinder the retraction of the pulling assembly 103 and engages the tray 60 during the transporting cycle.

Instead of using a spring propelled or self propelled pull lever it is possible to use a motorized or electrically activated pull lever or a pull pin such as 103M and 103N as shown in FIGS. 14C and 14D. The pull lever 103M comprises a motor 103U with a worm and a mating worm gear with a cam assembly 103P. A motor 103U will rotate the worm gear/cam assembly such that the cam protrudes during the transporting and retracts inwards into the pulling assembly body 102 during the retracting cycle. The pull lever 103N is a plunger pin 103W of a magnetic activated plunger unit 103Q that is retracting into the plunger body when electrical power is applied to the plunger coil during the retracting cycle, while during the transporting cycle the electrical power is cut, the plunger 103W is propelled and engages the cutout 65L of the tray 60.

Figure 13:
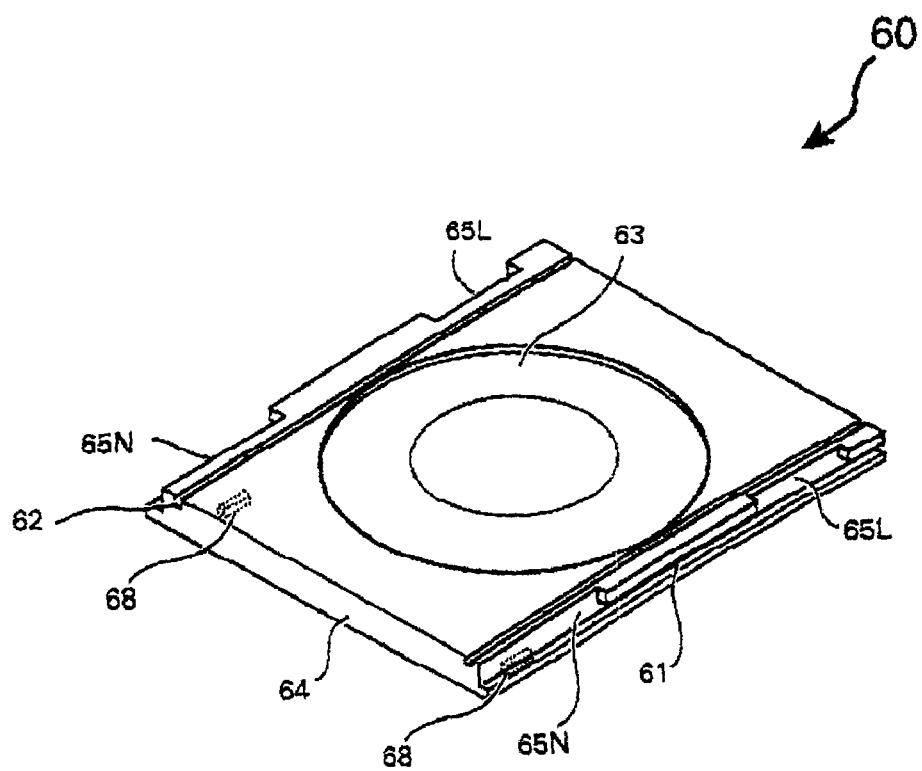
FIG. 13 is a perspective view of an embodiment of a tray for supporting a disk.

The tray 60 shown in FIG. 13 includes a recessed compartment 63 for supporting a disk, the side cutouts 65L and 65N for engaging the tray by the pull lever of FIG. 14B, a single or dual groves 62 (FIG. 13) for supporting a single or dual guides 68 of the tray on top of it in the tray stack. The single or dual guides 68 are provided for aligning the tray 60 into position onto the tray under it in the tray stack. Instead of the cutout 65L used for engaging the pull lever 103 it is possible to add a projected portion on the side of the tray for engaging the pull lever. A grove 61 on the side of the tray 60 guides the tray movement onto the side rail 58 of the disk changer 130 of FIG. 10.

Figure 15:
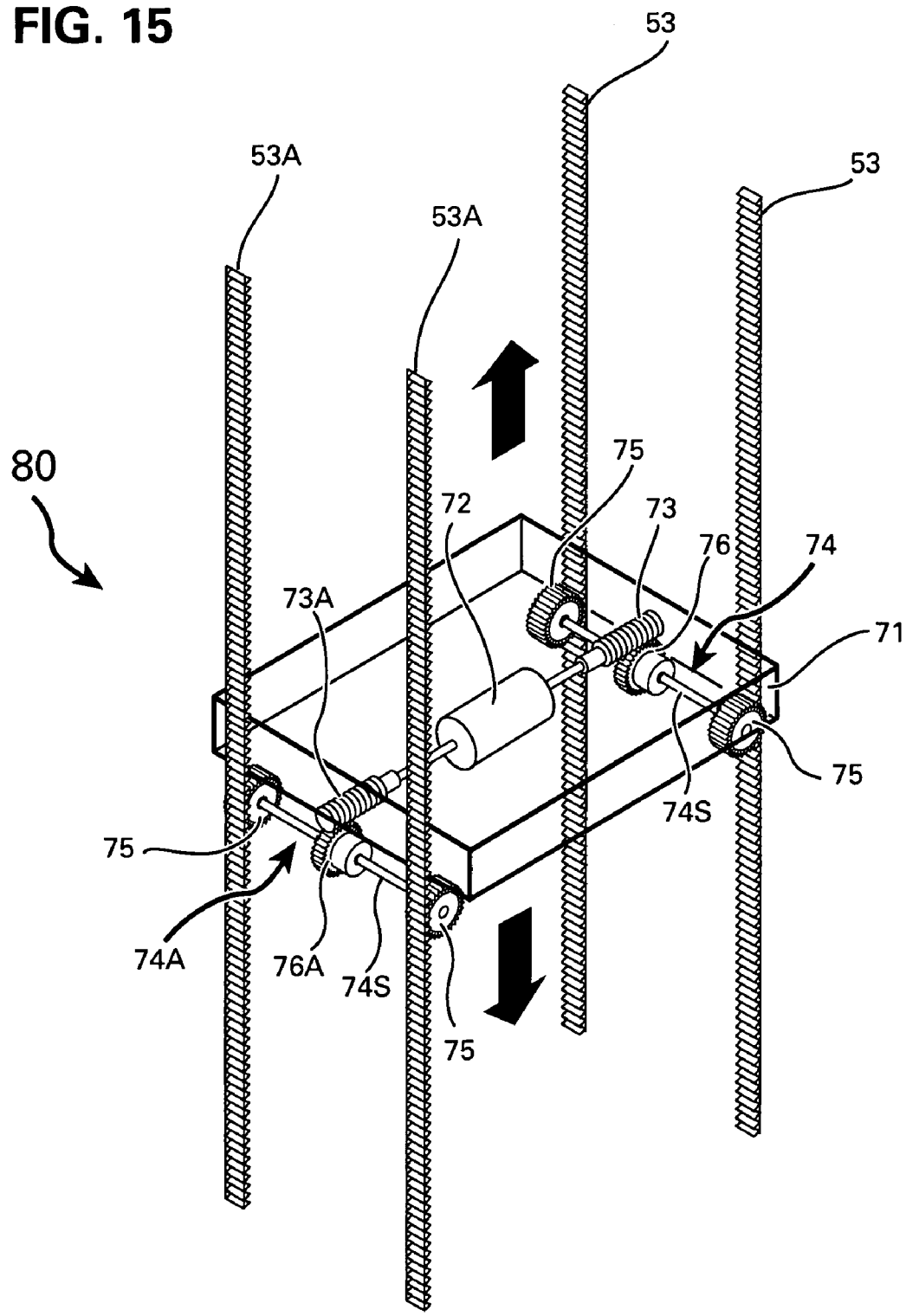
FIG. 15 is a perspective view of an elevating platform for up-down moving of the tray stacks and the disk recorders.

The elevating platform 80 shown in FIG. 15 comprises a platform body 71 attached to a motor 72 with dual ended shaft terminated with a clockwise worm 73 at one end and a counterclockwise worm 73A at the other end. The platform 71 is further attached to two gear assemblies 74 and 74A, each consisting of a mating worm gear 76 and 76A and a shaft 74S terminated with two gears 75 and 75A. The dual gear assemblies 74 and 74A are positioned against the dual gear racks 53 and 53A respectively, such that when the motor is energized and operated reciprocally the elevating platform will elevate or descend along the gear racks 53 and 53A that are mounted inside the fresh and the recorded tray compartments 59 and 85 of FIG. 10, respectively.

Well known LEDs, micro-switches or magnetic hall sensors and the like (not shown) can be employed to ensure correct and precise movements. Alternatively the motor 72 can be a stepping motor so that its step movements are precisely controlled, or other well known microprocessor control systems can be utilized to correctly and precisely set the up-down steps of the elevating platform 80 and/or how many steps should be incorporated in each command. Many other well known mechanical arrangements can be employed to raise or lower the elevating platform 80 such as chains and sprockets, timing belt with timing gears similar to the one shown in FIG. 14B or threaded shafts similar to the one shown in FIG. 6D.

The digital recording apparatus 130 of FIG. 10 comprises a single disk recorder 55 having a finite recording capacity per time unit and it may be necessary to provide multiple disk recorders 55 to increase the recording capacity per time unit. For this the digital recording apparatus 131 of FIG. 11 comprises two disk recorders 55 mounted on top of an elevating platform 80A, which is identical to the elevating platforms 80 and 80B for elevating or descending the disk recorders 55 along the gear racks 53 and 53A mounted in the disk recorder compartment 90.

The upper disk recorder 55-1 is positioned precisely as the disk recorder 55 of FIG. 10 is positioned and when the loading and unloading trays to and from the disk recorder 55-1 takes place the digital recording apparatus 51 will operate in the exact same manner as the digital recorder apparatus 130 of FIG. 10 is operated. However, when the need to unload and load a tray into the lower disk recorder 55-2 the elevating platform 80A is activated to raise the disk recorder 55-2 along with the disk recorder 55-1 by several steps to align the disk recorder 55-2 with the tray 60 and tray 60Z shown in FIG. 12.

Same procedure will be applied to three, four, or more disk recorders 55 that may be added to the digital recorder apparatus 51. Alternatively, the three elevating platforms 80, 80A, 80B and the pulling assembly 100 along with an elevating platform for the guide rail and gear rack assembly 101 (not shown) may be raised or lowered in concert, such that the loaded and unloaded trays are aligned for transporting the fresh trays 60 into the respective disk recorders 55-1, or 55-2 or into additionally added disk recorders 55 and the recorded trays 60B onto the recorded tray stack.

Figure 11:
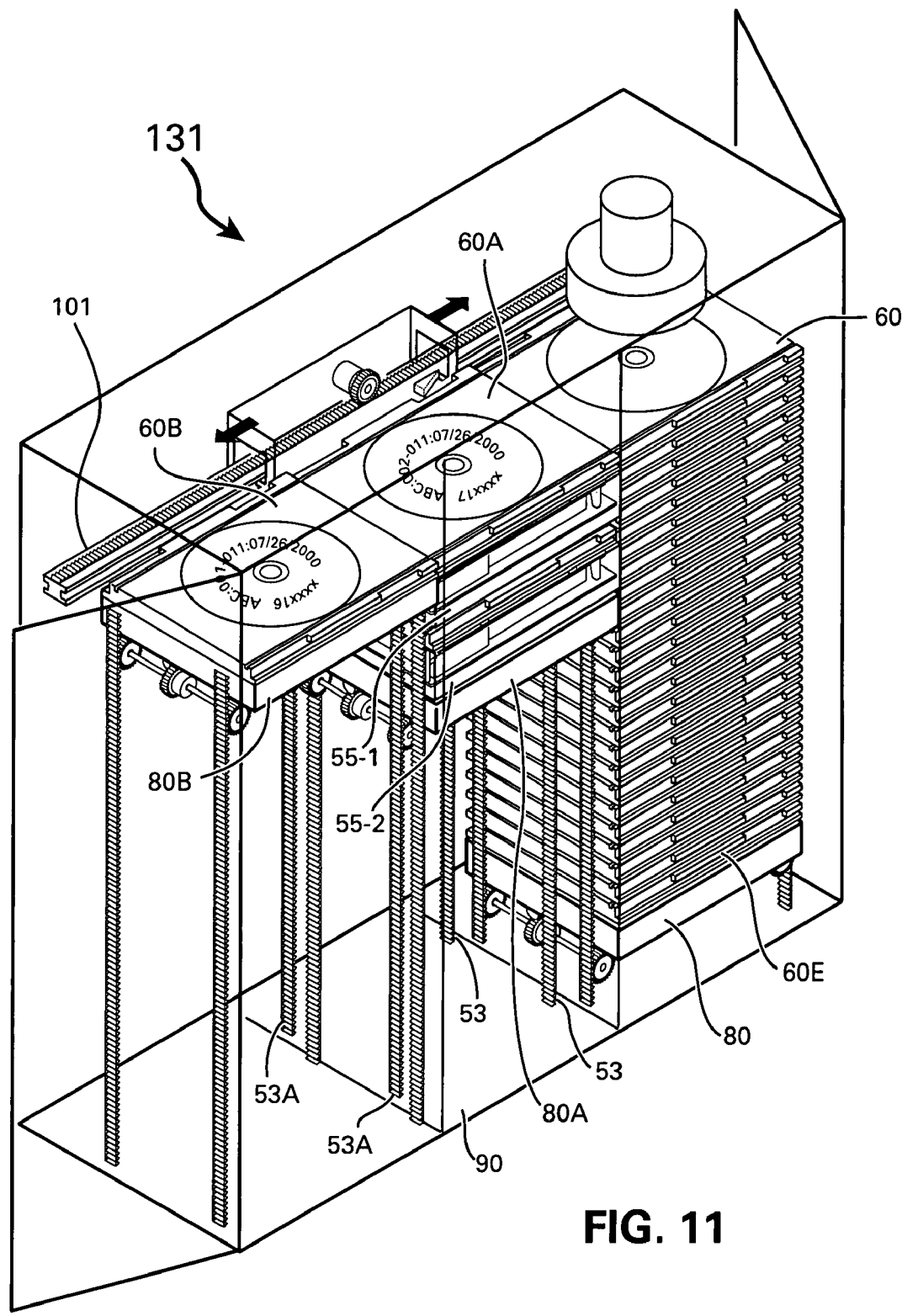
FIG. 11 is a perspective view of an expanded exemplary embodiment of a digital recording apparatus of FIG. 10 with two disk recorders.

The disk-feeding apparatuses 130 and 131 of FIGS. 10 and 11 respectively, can be used for recording of digital signals onto well known digital disks such as CD or DVD for purposes other than video and/or with or without the use of the imprinter and/or the code reader 9. For such application it is possible to use the described disk feeding apparatus with or without the imprinter and/or the code reader 9.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention:

What is claimed is:

1. A disk recorder apparatus for authenticating a disk containing a digital video signal of at least one camera, recorded onto a fresh disk by a disk recorder, said disk recorder comprising:
    controller including code generator for generating an exclusive code and a corresponding code signal for said fresh disk, said exclusive code including data identifying the data source of the digital video signal recorded on the disk, and a code mixer for mixing said digital video signal and said code signal;
    a pull lever;
    a fresh disk tray for receiving said fresh disk including one or more cutouts, and one of notches and projections for engagement by said pull lever;
    a fresh disk tray compartment for loading one or more fresh disk trays including an elevating platform for raising or lowering said fresh disk tray into a feeding position;
    a printer comprising an imprinting head supported by a reciprocal up-down arm, for comprising said exclusive code onto the label side of said fresh disk contained in said tray when said tray is in said feeding position;
    a disk driver, a recording head and a pulling table including said pall lever for engaging and transporting said fresh disk tray with an imprinted fresh disk from said feeding position to said disk driver and said recording head for recording said digital video signals mixed or combined with said code signal onto said imprinted fresh disk;
    a disk collection compartment for collecting recorded disks contained in said trays including a disk collection elevating platform which is raised or lowered along with the collected trays to a receiving position for receiving a subsequent tray, wherein
    a tray containing recorded disk is pushed into said receiving position by said fresh disk tray, or by an additional pull lever included in said pulling table during said transporting and wherein said label side is the surface opposite to the recording surface of said disk.

2. The disk recorder apparatus for authenticating a disk according to claim 1, wherein said imprinting head includes a code reader and said recording head includes a playback head and said controller includes a code extractor and a code comparator, wherein said code reader reads said exclusive code from said label side of said recorded disk and said playback head plays back said digital video signals mixed or combined with said code signals; and
    said code extractor extracts said exclusive code from the playback signal and said code comparator outputs authentication signal when the read exclusive code and the extracted exclusive code commensurate.

3. A disk recorder apparatus for authenticating a disk containing digital video signals of at least one camera, recorded onto a labeled fresh disk by a disk recorder, said labeled fresh disk including an exclusive code imprinted onto the label side of said disk said exclusive code including data identifying the data source of the digital video signal recorded on the disk, said disk recorder comprising:
    controller including code generator for generating code signal corresponding to said exclusive code for each said fresh disk and a code mixer for mixing said digital video signal and sand code signal;
    a pull lever;
    a fresh disk way for receiving said labeled fresh disk and comprising one or more cutouts, and one of notches and projections for engagement by said pull lever;
    a fresh disk compartment for loading one or more said fresh disk trays and including an elevating platform for raising or lowering said fresh disk way into a feeding position;
    a code reader supported by a reciprocal up-down aria, for reading said exclusive code from said label side when said labeled fresh disk contained in said disk tray is in said feeding position;
    a disk driver, a recording head and a pulling table including said pull lever for engaging and transporting said fresh disk way with said labeled fresh disk from said feeding position to said disk driver and said recording head for recording said digital video signal mixed with said code signal onto said labeled fresh disk;

a disk collection compartment for collecting recorded disks contained in said trays including a disk collection elevating platform which is raised or lowered along with the collected trays to at receiving position for receiving a subsequent tray, wherein a disk tray containing recorded disk is pushed into said receiving position by said fresh disk tray, or by an additional pull lever included in said pulling table during said transporting and wherein said label side is the surface opposite to the recording surface or said disk.

4. The disk recorder apparatus for authenticating a disk according to claim 3, wherein said recording head includes a playback head for playing back the recorded digital video signal mixed with said code signal from said recorded disk and said controller includes a code extractor and a code comparator; and said code extractor extracts said exclusive code from the playback signal and said code comparator outputs authentication signal when the read exclusive code and the extracted exclusive code correspond.

5. The disk recorder apparatus for authenticating a disk according to claim 1, wherein said fresh disk is one of a non-erasable disk and a re-recordable disk.

6. The disk recorder apparatus for authenticating a disk according to claim 3, wherein said labeled disk is one of a non-erasable disk and a re-recordable disk.

7. The disk recorder apparatus far authenticating a disk according to claim 1, wherein said printer is selected from a group consisting of a laser printer, an ink jet printer, a heat stamp printer, an ink pad printer, an optical/chemical printer, a ribbon printer and a rubber pad printer.

8. The disk recorder apparatus for authenticating a disk according to claim 1, wherein said imprinting head is a label applicator for attaching an exclusively coded labels onto said label side of said fresh disk.

9. The disk recorder apparatus for authenticating a disk according to claim 3, wherein said exclusive code is imprinted onto a label attached to said label side of said labeled fresh disk.

10. The disk recorder apparatus for authenticating a disk according to claim 1, wherein said pull lever is selected from a group consisting of a self-propelled lever, a spring propelled lever, a motor-activated lever and an electrical plunger-activated lever.

11. The disk recorder apparatus for authenticating a disk according to claim 3, wherein said pull lever is selected from a group consisting of a self-propelled lever, a spring propelled lever, a motor-activated lever and an electrical plunger-activated lever.

12. The disk recorder apparatus for authenticating a disk according to claim 1, wherein said elevating platform includes an elevating mechanism selected from the group consisting of gear assemblies with gear racks, timing belts with timing gears and threaded shafts with mating threaded sockets.

13. The disk recorder apparatus for authenticating a disc according to claim 1, wherein said elevating platform includes an elevating mechanism selected from the group consisting of gear assemblies with gear racks, timing belts with timing gears and threaded shafts with mating threaded sockets.

14. The disk recorder apparatus for authenticating a disk according to claim 1, wherein said disk recorder includes at least two disk recording modules vertically stacked and mounted on top of a module elevating platform, each of said disk recording module includes a disk driver and a recording head, and wherein said module elevating platform is raised or lowered along with said disk recording modules for aligning each of said disk recording modules with said feeding position and said receiving position during said disk tray transporting.

15. The disk recorder apparatus for authenticating a disk according to claim 2, wherein said disk recorder includes at least two disk recording modules vertically stacked and mounted on top of a module elevating platform, each of said disk recording module includes a disk driver and a recording head, and wherein said module elevating platform is raised or lowered along with said disk recording modules for aligning each of said disk recording modules with said feeding position and said receiving position during said disk tray transporting.

16. The disk recorder apparatus for authenticating a disk according to claim 3, wherein said disk recorder includes at least two disk recording modules vertically stacked and mounted on top of a module elevating platform, each of said disk recording module includes a disk driver and a recording head, and wherein said module elevating platform is raised or lowered along with said disk recording modules for aligning each of said disk recording modules with said feeding position and said receiving position during said disk tray transporting.

17. The disk recorder apparatus for authenticating a disk according to claim 4, wherein said disk recorder includes at least two disk recording modules vertically stacked and mounted on lop of a module elevating platform, each of said disk recording module includes a disk driver and a recording head, and wherein said module elevating platform is raised or lowered along with said disk recording modules for aligning each of said disk recording modules with said feeding position and said receiving position during said disk tray transporting.

18. A disk recording apparatus for automatic feeding of disks for recording digital signals, comprising:

a fresh disk tray for enclosing a fresh disk and including one or more cutouts, notches and projections for engagement by a pull lever;

a fresh disk tray compartment for loading one or more said fresh disk trays and including an elevating platform for raising or lowering a fresh disk tray into a feeding position;

a disk recorder module including a disk driver, a recording and feedback head, a controller, and a pulling table including said pull lever for engaging and transporting said disk tray from said feeding position to said disk driver and to said recording and readback head for recording said digital signals onto said fresh disk or for reading back said digital signals from said recorded disk;

a disk collection compartment for collecting said trays containing said recorded disks and including a disk collection elevating platform which is raised and lowered along with collected trays containing recorded disks to a receiving position for receiving a subsequent tray containing recorded disk; wherein said trays for enclosing fresh disks and said trays for enclosing recorded disks are identical, and said tray containing recorded disk is pushed into said receiving position by said tray containing fresh disk, or by an additional pull lever included in said pulling table during said transporting.

19. The disk recording apparatus according to claim 18, wherein said fresh disk is one of a non-erasable disk and a re-recordable disk.

20. The disk recording apparatus according to claim 18, wherein said pull lever is selected from a group consisting of a self-propelled lever, a spring-propelled lever, a motor-activated lever and an electrical plunger-activated lever.

21. The disk recording apparatus according to claim 18, wherein said elevating platform includes an elevating mechanism selected from a group consisting of gear assemblies with gear racks, timing belts with timing gears and threaded shafts with mating threaded sockets.

22. The disk recording apparatus according to claim 18, wherein said apparatus includes at least two disk recording modules, vertically stacked and mounted on top of a module elevating platform, each of said disk recording module includes a disk driver, a recording and readback head, and wherein said module elevating platform is raised or lowered along with said disk recording modules for aligning each of said disk recording modules with said feeding position and said receiving position during said disk tray transporting.

* * * * *